June 2, 1959

C. C. NOGLE 2,889,073

MAGNETIC FEED HOPPER

Filed May 6, 1957

INVENTOR.
CHARLES C. NOGLE

BY

Mellin and Hanscom

ATTORNEYS

June 2, 1959 C. C. NOGLE 2,889,073
MAGNETIC FEED HOPPER
Filed May 6, 1957 4 Sheets-Sheet 3

INVENTOR.
CHARLES C. NOGLE
BY
Mellin and Hanscom
ATTORNEYS

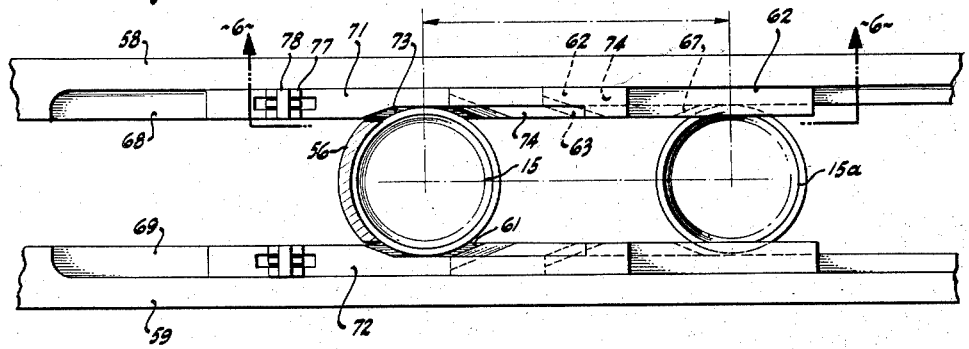
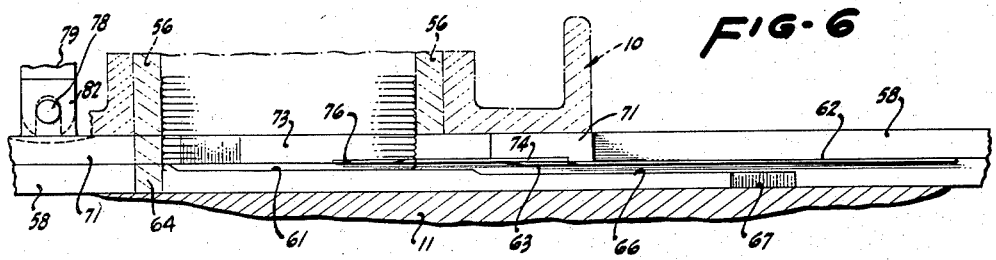

United States Patent Office 2,889,073
Patented June 2, 1959

2,889,073

MAGNETIC FEED HOPPER

Charles C. Nogle, Castro Valley, Calif., assignor to United Can and Glass Company, Hayward, Calif., a corporation of Delaware Application May 6, 1957, Serial No. 657,262

7 Claims. (Cl. 221—10)

This invention relates to a feed hopper and more specifically a magnetic feed hopper adapted to receive can lids from a lid source and to supply such lids to a can lid handling mechanism.

In canning operations, it is customary to use a feed hopper to supply can lids to a lid handling machine, for example, to a machine for applying a can lid to the top or bottom of a can body, with the hopper kept full of can lids either manually or automatically. It is essential that the can lids be properly oriented in the hopper, so that they are all right side up or all inverted, as desired. If the hopper is fed by hand, it is a relatively simple job to see that all of the can lids are properly oriented. However, if the hopper is fed automatically, as from a conveyor or chute arrangement, there is a danger that the lids entering the top of the hopper will tumble as they descend in the hopper so that one or more of the lids will be inverted from the others when fed from the hopper. One solution to the tumbling of the lids in a conventional hopper is to keep the hopper almost full at all times, so that the vertical distance in which the newly introduced lids may fall is limited, in order that none of the lids will be inverted. This solution has the drawback that the rate at which can lids enter the hopper must be approximately the same as the rate of the lids leaving the hopper, thereby necessitating that the can lid entry be closely regulated.

The present invention provides a can lid hopper having magnets along the length of the hopper so that the edges of the lids will be attracted by the magnets and will be prevented from tumbling in the hopper as they descend therein. With the tumbling of the lids being prevented, the working level of the can lids stacked in the hopper may vary over a wide range without affecting the insertion or removal of lids from the hopper. In this manner, the necessity of closely regulating the rate of can lids coming into the hopper to the rate of can lids leaving the hopper is done away with to a large extent.

A principal object of this invention is to provide a feed hopper with magnets spaced therealong so that tumbling of can lids inserted at the top thereof will be eliminated.

A further object of the invention is to provide a vertically disposed non-magnetic tubular hopper having a plurality of vertically elongated magnet means disposed longitudinally thereof.

Another object of the invention is to provide a hopper as set forth in the preceding object with a conveyor means to introduce can lids into said hopper so that the can lids will be initially generally horizontally disposed.

A yet further object of the invention is to provide a hopper, as set forth in the preceding objects, having a cut-off slide operable to prevent removal of can lids therefrom, and a pair of vertically spaced switch actuators in said hopper responsive to the can stack level therein to control the operation of said cut-off slide.

A still further object of the invention is to provide a hopper as set forth in the last object with a switch responsive to the level of the can stack in the hopper to deactivate the mechanism introducing can lids into the hopper.

Other objects and advantages will become apparent in the course of the following detailed description.

In the accompanying drawings, forming a part of this application, and in which like numerals are employed to designate like parts throughout the same, Fig. 1 is a plan view of a feed hopper embodying the principle of the invention.

Fig. 5 is a sectional view taken on line 5—5 of Fig. 2.

Fig. 6 is an enlarged sectional view taken on line 6—6 of Fig. 5.

Fig. 7 is a wiring diagram illustrating the operation of the hopper switches.

Figure 1:
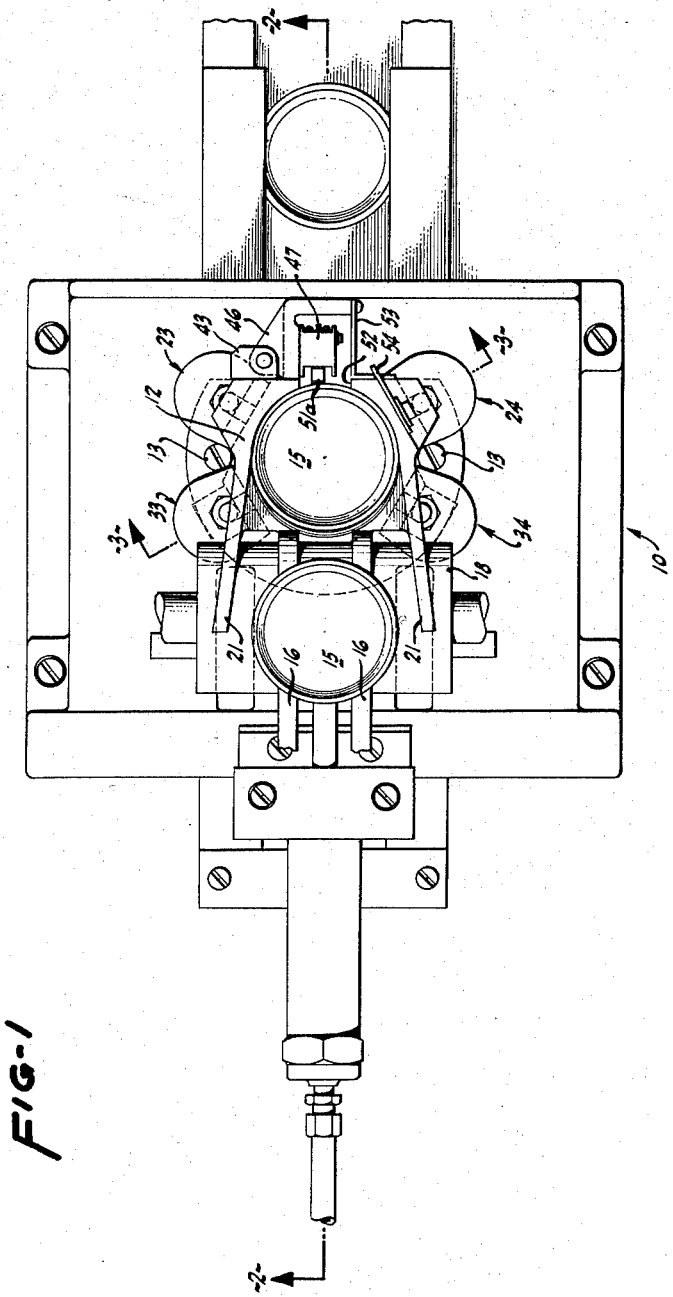

In the accompanying drawings, wherein for purposes of illustration is shown a preferred embodiment of the invention, the reference numeral 10 refers generally to the feed hopper frame which is adapted to be supported on a suitable machine frame 11.

A generally circular, vertically disposed, elongated and tubular hopper 12, made of non-magnetic material is rigidly mounted on frame 10 by suitable means, such as bolts 13, and has an inner wall surface 14 having a cross-sectional diameter or shape slightly greater than the diameter or shape of the can lids 15 for which the hopper is designed.

The upper end of the hopper 12 is open on one side so as to provide a generally semicircular opening through which can lids 15 may be delivered from the upper flight 16 of conveyor belt 17. This belt is trained around a pulley, or roller, 18 so that the belt passes downwardly around the roller, with the surface 19 of belt 17 projecting slightly within the upwardly projected inner surface of the hopper 12. Wing members 21, formed integrally with the upper end of hopper 12, provide guides for the can lids 15 as they enter the hopper.

Figures 3, 4:
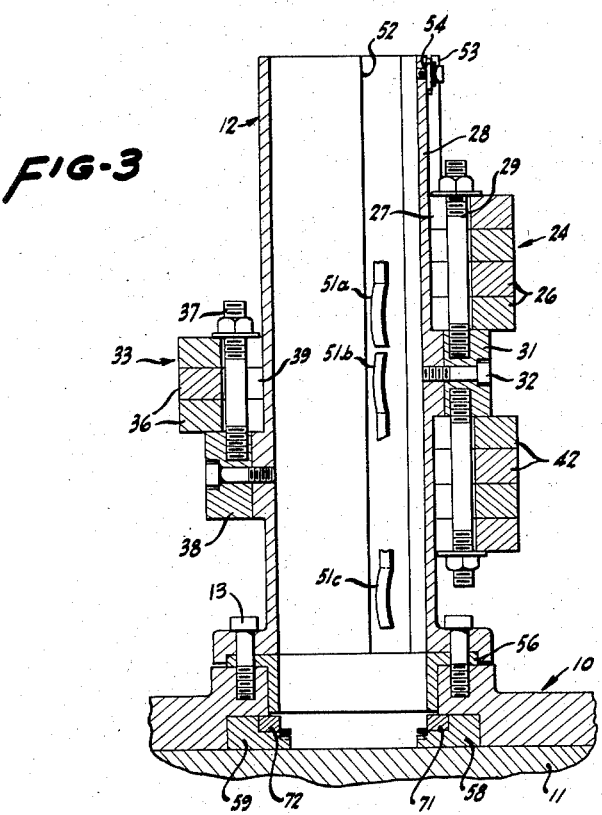
Fig. 3 is a sectional view taken on line 3—3 of Fig. 1.
Fig. 4 is a sectional view taken on line 4—4 of Fig. 2.

A first pair of vertically elongated magnet means 23 and 24 is mounted on the outer wall of hopper 12, on the opposite side of the hopper from the can lid delivery opening. As best seen in Figs. 1 and 3, magnet means 24 comprises a plurality of vertically disposed permanent magnets 26 of horseshoe configuration having their pole pieces 27 engaging the outer wall 28 of hopper 12 and held in assembled relation thereto by bolt 29 passing through the magnets 26 and secured to a support member 31 fixed to the hopper 12 by bolt 32. The number of magnets 26 which may be used in the magnet means 24 may be varied so as to cover a greater or lesser longitudinal length of hopper 12, as desired. Although the drawings illustrate the use of permanent magnets, it is within the scope of this invention to utilize electromagnets for the same purpose, if desired. The magnet means 23 is built up in the same manner as above described.

A second set of magnet means 33 and 34 is mounted on the outer wall of the hopper, on the same side as the delivery opening, with the magnet means 33 and 34 being generally below the first pair of magnet means 23 and 24. Again, the magnet means 33 and 34 are assembled as described above, with the horseshoe magnets 36 of magnet means 33 being fixed by bolt 37 to support member 38 so that the pole pieces 39 are in engagement with the outer wall 28 of hopper 12.

A third pair of magnet means 41 and 42 is fixed to the hopper 12, on the same side of the hopper as are magnet means 23 and 24, with the magnet means 41 and 42 being generally below the magnet means 33 and 34. Thus, the various magnet means are disposed in the hopper in a circumferentially staggered relationship vertically of the hopper.

Figure 2:
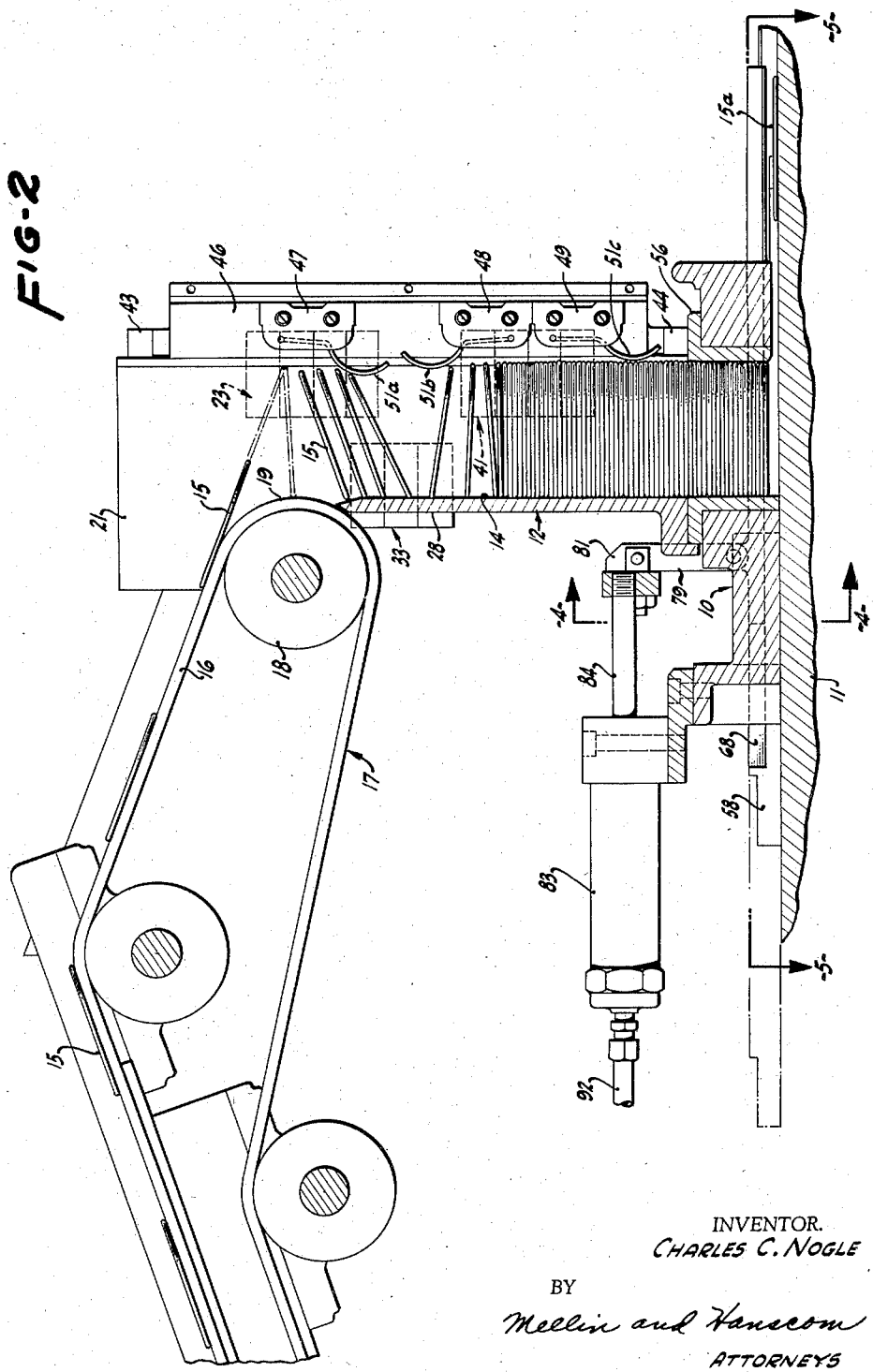
Fig. 2 is an elevational sectional view of the invention, taken on line 2—2 of Fig. 1.

Brackets 43 and 44 are fixed on hopper 12 to hingedly support switch mounting assembly 46 having switches 47, 48 and 49 mounted thereon. Each switch has a curved actuating arm 51a, 51b and 51c, respectively, spring biased so as to protrude through slot 52 in hopper 12 to normally lie within the longitudinal bore of the hopper, so that when the can lids within the hopper have built up to the level of the switch actuators, the switch will be actuated, for a purpose to be hereinafter described. In Fig. 2, switch 49 is shown as having been actuated by the stack of can lids 15, while switches 47 and 48 are shown as being in their normal, or un-actuated position.

When the switch mounting assembly 46 has been moved to its position as shown in Fig. 1, bracket 53, fixed thereto, encloses the switches 47, 48 and 49, and is latched to hopper 12 by snap latch 54. If it is desired to gain entry to the switches, the latch 54 is moved to release bracket 53, and the assembly 46 is swung open about hopper brackets 43 and 44.

Since the hopper 12 is generally of a relatively soft non-magnetic material, a wear sleeve 56 is mounted in frame 10 to provide a bottom extension of hopper 12, the wear sleeve having an inner surface co-extensive with the inner wall 14 of hopper 12. The wear sleeve 56 may be of any suitable material capable of resisting abrasive wear caused by the cut-off slide or the reciprocating feed bars cooperating therewith, as will be explained.

A can lid feeding means is provided to strip the can lids one by one from the hopper 12 and comprises a pair of feed bars 58 and 59 slidably mounted in frame 10 and reciprocated longitudinally in unison by conventional means (not shown). As the feed bars 58 and 59 are identical mirror images of one another, only feed bar 58 will be described in detail. In Figs. 5 and 6, feed bar 58 is shown at its rightward limit of travel, with the lowermost can lid in the hopper resting on the uppermost shoulder 61 of the feed bar. A horizontally disposed knife member 62, fixed to the feed bar 58, is provided with an upper surface spaced one can lid thickness above shoulder 61 and a knife edge 63 inclined downwardly and forwardly from the upper surface thereof so that when the feed bar 58 moves to the left, the knife edge 63 will slide into the stack of can lids between the lowermost lid resting on the shoulder 61 and the next upwardly adjacent lid. The lids will be held from moving rearwardly with the feed bar by the downwardly depending portion 64 of the wear sleeve 56, and the lowermost can lid will be peeled from the stack downwardly onto shoulder 66 of feed bar 58, with the remaining can lids being supported upon the knife member 62. As the feed bars move rearwardly (or leftwardly), the shoulder 66 will be moved from supporting engagement of the lowermost can lid so that it will be peeled from the stack downwardy onto shoulder 66 of feed bar 58, with the remaining can lids being supported upon the knife member 62. At its rearward (or leftward) limit of travel, the shoulder 66 will be moved from supporting engagement of the lowermost can lid so that it will fall therefrom onto the machine frame 11. The inclined face 67 of shoulder 66 engages the edge of the can lid and moves it forwardly as the feed bar 58 moves forwardly, so that the can lid will move to the position shown at 15a. At the same time, the knife member 62 will move forwardly until the stack of can lids held thereby will be unsupported and the stack will move downwardly so that the now lowermost can lid rests on shoulder 61, in order that the operation may be repeated. On each forward stroke of the feed bars, the can lid at 15a will also be moved forwardly by conventional means (not shown).

Each feed bar 58 and 59 is grooved at 68 and 69 to receive the cut-off members 71 and 72 longitudinally reciprocable therein. Again, the cut-off members 71 and 72 are identical mirror images and only cut-off member 71 will be described. The cut-off member 71 is shown in Figs. 5 and 6 as being in the noncut-off position, with a recess 73 formed in the cut-off member 71 to enable the can lids in the hopper 12 to pass downwardly onto shoulder 66 of the feed bar 58. A knife member 74, fixed to cut-off member 71, has the lower surface thereof one can lid thickness above shoulder 61 of feed bar 58, and has a knife edge 76 inclined upwardly and forwardly from the rear of the lower surface. As is apparent, if the cut-off member 71 is moved rearwardly (or leftwardly), the knife edge 76 will slide into the stack of can lids between the lowermost can lid resting on shoulder 61 and the next upwardly adjacent can lid, so that the entire stack above the lowermost can lid will be supported on the knife member 74. The feed bar 58 may continue to reciprocate, but no further can lids will drop onto shoulder 61, and, accordingly, no further can lids will be fed from the hopper. When the cut-off member 71 is then moved to the right, the knife member 74 will move from supporting engagement of the lids and they will again drop through the recess 73 of the cut-off member and onto shoulder 61.

Cut-off member 71 is provided with integrally formed upwardly extending ears 77 carrying pin 78 therebetween. A bar 79, fixed to yoke 81, has a lower slotted end 82 receiving the pin 78 therein, and cut-off member 72 is similarly connected to yoke 81. A pneumatic cylinder 83 is fixed to the hopper frame 10, and is provided with a spring biased piston 84 connected to yoke 81. Whenever air under pressure is supplied to cylinder 83 it will cause piston 84 to move to the right against the bias of spring 86, in turn causing the cut-off members 71 and 72 to move to the position as shown in Figs. 5 and 6. If air is released from the cylinder 83, the spring 86 will force the piston 84 to the left, causing the cut-off members 71 and 72 to slide into lid stopping engagement with the lids stacked in the hopper 12.

Fig. 7 shows the control system used in connection with the hopper. A double acting solenoid controlled valve 87 is provided, having an air inlet 88 adapted to be connected to a conventional source of air under pressure. A conventional valve mechanism (not illustrated) within the valve 87 connects the inlet 88 to outlet 89 whenever solenoid actuator 91 is energized. Conduit 90 communicates the valve outlet 89 with the cylinder 83. When so moved, the valve mechanism will continue to connect the inlet 88 with outlet 89 regardless of the state of energization of solenoid actuator 91. If the solenoid actuator 92 is energized, the valve mechanism will slide within the valve 87 to connect the valve outlet 89 to atmosphere through opening 93, and this connection will be maintained until the solenoid actuator 91 is later energized.

The lowermost, normally open, hopper switch 49 connects one side of an electrical power source 94 through solenoid actuator 92 to the ground connection 96 of the other side of the power source. The middle, normally open, hopper switch 48 is adapted to connect the solenoid actuator 91 between the power source terminals 94 and 96, and the uppermost, normally open, hopper switch 47 is adapted to connect the control relay 97 between the power source terminals 94 and 96. Relay 97 controls a normally closed switch 98 which opens the power supply to the motor drive 99 for the feed belt conveyor 17 whenever the relay 97 is energized.

In the operation of the device, the feed hopper 12 will be initially empty, with switch 49 being closed and switches 47 and 48 being open. The feed bars 58 and 59 will be operating, but no can lids will yet be fed thereto.

With switch 49 being closed, the cylinder 83 will be bled to atmosphere, and the piston 84 will have moved the cut-off members 71 and 72 to cut-off position.

The feed belt conveyor drive 99 is energized so that the feed belt 17 will begin to convey can lids into the top of the hopper. As seen in Fig. 2, the feed belt is operated at a sufficiently high linear speed so that the lids thereon are projected into the hopper 12 with the forward edge of the lids hitting the opposite wall of the hopper, the forward edge of the lids being held thereagainst by the magnet means 23 and 24. The rearward edge of the can lids will be urged downwardly by the forward surface 19 of feed belt 17 to a generally horizontal position, as shown by the dotted line position, in order that the next lid coming into the hopper may enter above the previous lid.

The lids will then slide down the hopper wall due to the operational vibration of the hopper and under the force of gravity, with the forward edge being attracted by the magnet means 23 and 24 to prevent the lids from inverting in the hopper. As the lids slide downwardly in the hopper, they will come under the attraction of the magnet means 33 and 34, and the rearward edges of the lids will be attracted to prevent inversion of the lids when the forward edges of the lids become free from the attraction of the magnet means 23 and 24. The forward edges are now free to tilt slightly and slide over the hopper switch actuators 51a and 51b which are spring biased into the hopper bore with sufficient force to prevent actuation by the falling can lids.

Similarly, the lids come into attracted relation with the magnet means 41 and 42 upon further downward movement within the hopper and again lid inversion is prevented. The magnet means 41 and 42 extend downwardly along the hopper 12 so that when the lids finally slide out of attracted relationship thereto, there will be insufficient distance in which inversion could occur. Again, as the lids fall past the switch actuator 51c, they will tilt slightly to ride over the actuator without operating the switch 49.

In due course, the lids will stack up in the hopper 12 (since the cut-off members 71 and 72 are in shut-off position) and the switch actuator 51c will be forced outwardly to open switch 49. This has no effect at the time on the position of valve 87, and the cylinder 83 will continue to be bled to atmosphere. The lids continue to stack up in the hopper until they reach the height of switch actuator 51b and force this switch actuator outwardly to close switch 48, in turn energizing the valve actuator 91, causing valve 87 to admit air under pressure to cylinder 83, thus moving the cut-off members 71 and 72 out of the cut-off position.

The can lids are now free to drop down onto the feed bars 58 and 59 to be removed from the hopper thereby, as previously explained. The stack height of the can lids in the hopper can vary widely without affecting the removal by feed bars. That is, the stack may fall to the level of the lowermost switch actuator 51c, or may rise to any level above the middle switch actuator 51a, and the feed bars will continue to remove the lids from the hopper.

If the level of the lids falls below the lowermost switch actuator 51c, switch 49 will close to energize valve actuator 92, bleeding cylinder 83 and causing the cut-off members 71 and 72 to move to cut-off position, preventing any lids from feeding from the hopper until the can lid stack builds up sufficiently to trip switch 48.

If the can lid stack builds up to the level of the switch actuator 51a, the switch 47 will close to energize relay 97, thereby discontinuing the operation of the feed belt conveyor drive 99. The can lids will thus be prevented from overfilling or jamming the hopper 12. When the lid stack height falls below the switch actuator of switch 47, the conveyor belt will again start up to supply the hopper with lids.

By virtue of the magnet means disposed on the outer wall of the hopper, the can lids are prevented from tumbling in the hopper if the can stack is low, and thus the hopper 12 need not be kept practically full of lids, but rather, the stack height can vary at any level between the upper and lower switches, 47 and 49, without affecting the feeding of can lids into or out of the feed hopper.

It is to be understood that the form of the invention herewith shown and described is to be taken as a preferred embodiment of the same, and that various changes in the shape, size and arrangement of parts may be resorted to without departing from the spirit of the invention or the scope of the attached claims. As, for example, although a cylindrical hopper for use with circular can lids has been shown, the hopper may be oval or rectangular for such shape lids, if desired.

Having thus described my invention, what I claim and desire to secure by Letters Patent is:

1. A can lid feed device comprising an elongated, vertically disposed, non-magnetic, tubular hopper, said hopper having a generally semicircular opening on one side adjacent the top thereof, a feed belt disposed adjacent said opening and having an upper flight adapted to deliver can lids through said opening so that said lids will strike the opposite side of said hopper, said feed belt having a downwardly extending forward surface portion substantially in alignment with the inner wall of said one side, and a vertically elongated magnet means disposed along the outer wall of said opposite side of said hopper opposite from said opening.

2. A can lid feed device comprising an elongated, vertically disposed, non-magnetic, tubular hopper, said hopper having a generally semicircular opening on one side adjacent the top thereof, a feed belt disposed adjacent said opening and having an upper flight adapted to deliver can lids through said opening so that said lids will strike the opposite side of said hopper, said feed belt having a downwardly extending forward surface portion substantially in alignment with the inner wall of said one side, a first vertically elongated magnet means disposed along the outer wall of said opposite side of said hopper opposite from said opening, a second vertically elongated magnet means disposed along the outer wall of said one side of said hopper generally below said first magnet means, a third vertically elongated magnet means disposed on the outer wall of said opposite side of said hopper generally below said second magnet means, a wear sleeve disposed adjacent the bottom of said hopper and having an inner surface continuous with the inner surface of said hopper, and a cut-off slide movable into lid holding position adjacent the bottom of said wear sleeve to prevent can lids from issuing therefrom.

3. A can lid feed device comprising an elongated, vertically disposed, non-magnetic, tubular hopper, said hopper having a can lid feed opening on one side adjacent the top thereof, means to deliver can lids generally horizontally through said opening so that said lids will strike the opposite side of said hopper, a first vertically elongated magnet means disposed along the outer wall of said opposite side of said hopper opposite from said opening, a second vertically elongated magnet means disposed along the outer wall of said one side of said hopper generally below said first magnet means, a third vertically elongated magnet means disposed on the outer wall of said opposite side of said hopper generally below said second magnet means, a cut-off slide movable into lid holding position adjacent the bottom of said hopper to prevent can lids therein from issuing therefrom, a first switch means on the inner wall of said hopper, intermediate the ends thereof, adapted to be actuated by the building up of a stack of can lids to the height of said first switch, means responsive to an initial actuation only of said first switch to remove the cut-off slide from lid holding position, a second switch means on the inner wall of said hopper adjacent the lower end thereof adapted to be actuated by the absence of a stack of can lids built up to the level of said second switch, and means responsive only to the actuation of said second switch to move said cut-off slide into lid holding position.

4. A can lid feed device comprising an elongated, vertically disposed, non-magnetic, tubular hopper, means to deliver generally horizontally disposed can lids to said hopper, a vertically elongated magnet means disposed along the outer wall of said hopper, a cut-off slide movable into lid holding position adjacent the bottom of said hopper to prevent can lids therein from issuing therefrom, a first switch means on the inner wall of said hopper, intermediate the ends thereof, adapted to be actuated by the building up of a stack of can lids to the height of said first switch, means responsive to an initial actuation only of said first switch to remove the cut-off slide from lid holding position, a second switch means on the inner wall of said hopper adjacent the lower end thereof adapted to be actuated by the absence of a stack of can lids built up to the level of said second switch, and means responsive only to the actuation of said second switch to move said cut-off slide into lid holding position.

5. A can lid feed device comprising an elongated, vertically disposed, non-magnetic, tubular hopper, means to deliver generally horizontally disposed can lids to said hopper, a vertically elongated magnet means disposed along the outer wall of said hopper, a cut-off slide movable into lid holding position adjacent the bottom of said hopper to prevent can lids therein from issuing therefrom, a first switch means on the inner wall of said hopper, intermediate the ends thereof, adapted to be actuated by the building up of a stack of can lids to the height of said first switch, means responsive to an initial actuation only of said first switch to remove the cut-off slide from lid holding position, a second switch means on the inner wall of said hopper adjacent the lower end thereof adapted to be actuated by the absence of a stack of can lids built up to the level of said second switch, means responsive only to the actuation of said second switch to move said cut-off slide into lid holding position, a third switch means on the inner wall of said hopper above said second switch means adapted to be actuated by the building up of a stack of can lids to the height of said third switch, and means responsive only to the actuation of said third switch to stop the operation of said can lid delivery means.

6. A can lid feed device comprising an elongated, vertically disposed, non-magnetic, tubular hopper, said hopper having a generally semicircular opening on one side adjacent the top thereof, a feed belt disposed adjacent said opening and having an upper flight adapted to deliver can lids through said opening so that said lids will strike the opposite side of said hopper, said feed belt having a downwardly extending portion substantially in alignment with the inner wall of said one side, a plurality of vertically elongated magnet means disposed in a circumferentially staggered relationship longitudinally of said hopper, the uppermost of said magnet means being opposite from said opening, a wear sleeve disposed adjacent the bottom of said hopper and having an inner surface continuous with the inner surface of said hopper, a cut-off slide movable into lid holding position adjacent the bottom of said wear sleeve to prevent can lids therein from issuing therefrom, a first switch means on the inner wall of said hopper, intermediate the ends thereof, adapted to be actuated by the building up of a stack of can lids to the height of said first switch, means responsive to an initial actuation only of said first switch to remove the cut-off slide from lid holding position, a second switch means on the inner wall of said hopper adjacent the lower end thereof adapted to be actuated by the absence of a stack of can lids built up to the level of said second switch, and means responsive only to the actuation of said second switch to move said cut-off slide into lid holding position.

7. A can lid feed device comprising an elongated, vertically disposed, non-magnetic, tubular hopper, said hopper having a generally semicircular opening on one side adjacent the top thereof, a feed belt disposed adjacent said opening and having an upper flight adapted to deliver can lids through said opening so that said lids will strike the opposite side of said hopper, said feed belt having a downwardly extending portion substantially in alignment with the inner wall of said one side, a first vertically elongated magnet means disposed along the outer wall of said opposite side of said hopper opposite from said opening, a second vertically elongated magnet means disposed along the outer wall of said one side of said hopper generally below said first magnet means, a third vertically elongated magnet means disposed on the outer wall of said opposite side of said hopper generally below said second magnet means, a wear sleeve disposed adjacent the bottom of said hopper and having an inner surface continuous with the inner surface of said hopper, a cut-off slide movable into lid holding position adjacent the bottom of said wear sleeve to prevent can lids therein from issuing therefrom, a first switch means on the inner wall of said hopper, intermediate the ends thereof, adapted to be actuated by the building up of a stack of can lids to the height of said first switch, means responsive to an initial actuation only of said first switch to remove the cut-off slide from lid holding position, a second switch means on the inner wall of said hopper adjacent the lower end thereof adapted to be actuated by the absence of a stack of can lids built up to the level of said second switch, means responsive only to the actuation of said second switch to move said cut-off slide into lid holding position, a third switch means on the inner wall of said hopper intermediate said second switch means and said opening and adapted to be actuated by the building up of a stack of can lids to the height of said third switch, and means responsive only to the actuation of said third switch to stop the operation of said conveyor belt.

References Cited in the file of this patent

UNITED STATES PATENTS

| | | |
|---|---|---|
| 1,903,989 | Fink et al. | Apr. 18, 1933 |
| 2,486,415 | Huntar | Nov. 1, 1949 |
| 2,592,642 | Bardet | Apr. 15, 1952 |
| 2,609,779 | Goldsworthy | Sept. 9, 1952 |
| 2,640,605 | Chatterton | June 2, 1953 |
| 2,795,340 | Hommel | June 11, 1957 |

FOREIGN PATENTS

| | | |
|---|---|---|
| 219,237 | Germany | Feb. 21, 1910 |